United States Patent [19]

Laverty et al.

[11] 3,949,015

[45] Apr. 6, 1976

[54] INTERNALLY PLASTICIZED POLY(VINYL CHLORIDE)

[75] Inventors: John J. Laverty, Sterling Heights; Zachariah G. Gardlund, Utica, both of Mich.

[73] Assignee: General Motors Corporation, Detroit, Mich.

[22] Filed: Apr. 12, 1974

[21] Appl. No.: 460,285

[52] U.S. Cl. .............. 260/873; 260/75 N; 260/192; 260/475 P; 260/860; 260/899
[51] Int. Cl.² .................. C08L 27/06; C08L 67/00
[58] Field of Search ......... 260/899, 873, 860, 75 N, 260/475 P, 192

[56] References Cited
UNITED STATES PATENTS
3,752,802   8/1973   Sheppard............................ 260/192

OTHER PUBLICATIONS
Furukawa, J. et al., Chem. Abst., 68, 96448(e), 1968.

*Primary Examiner*—Christopher A. Henderson
*Attorney, Agent, or Firm*—George A. Grove

[57] ABSTRACT

Macroazonitrile molecules formed of flexible poly-(ethylene oxide) segments connected by azo linkages are heated in the presence of vinyl chloride to initiate the addition polymerization of the monomer onto the ends of the poly(ethylene oxide) segments. An ABA type block copolymer is formed wherein the A parts are poly(vinyl chloride) segments and B is a poly-(ethylene oxide) block which was originally part of the macroazonitrile. The flexible poly(ethylene oxide) segments of this block serve as an internal (intramolecular) plasticizer such that the copolymer may be used in applications typically filled by externally plasticized poly(vinyl chloride). External plasticizers are still required but their concentrations may be reduced to a level where plasticizer migration problems are eliminated.

5 Claims, No Drawings

INTERNALLY PLASTICIZED POLY(VINYL CHLORIDE)

BACKGROUND OF THE INVENTION

This invention relates to an internally plasticized poly(vinyl chloride)-containing block copolymer and a method of producing same. More specifically, it relates to a novel ABA type block copolymer wherein said A groups are formed from a vinyl monomer such as vinyl chloride and said B group is poly(ethylene oxide). This invention also relates to a process which employs macrobiradicals to initiate the polymerization of vinyl chloride.

It is well known that the flexibility of poly (vinylchloride) (PVC) may be significantly increased by the addition of an external plasticizer. This type of additive is effective at concentrations of 30 parts or more per 100 parts by weight of polymer, and functions by simply lubricating the polymer matrix. With this modification, normally rigid resins such as PVC may be used in sheet molding applications such as automotive seat covers. However, the typical external plasticizer tends to migrate to the surface of the material and then to evaporate, and this tendency generates a variety of problems.

In a product made from an externally plasticized poly(vinyl chloride) (PVC), the plasticizer migration problem is generally significant only if the plasticizer concentration exceeds 20 parts by weight per 100 parts of the resin (hereinafter "phr"). Unfortunately, 30 phr or more are usually required to provide adequate flexibility. Therefore, although the ultimate goal is to eliminate the external plasticizer, it would be a significant advance if the required plasticizer concentration could be reduced to 20 phr or less.

In view of this, efforts have been directed to incorporating a flexible polymeric group(s) having a glass transition temperature typically below minus 10°C. directly into the backbone of polymer molecules and thereby increasing their flexibility. Since this flexible "internal plasticizer" is part of the molecular structure, there is no plasticizer migration problem. The immediate success of these internally plasticized polymers, which are in reality copolymers, has led to the development of a growing art directed at the creation of tailored copolymeric materials specifically designed for particular applications.

The prior art teaches the copolymerization of vinyl chloride with many other vinyl monomers, such as vinylidene chloride, vinyl esters, vinyl acetates and acrylonitrile. The resulting copolymers do have a lower softening temperature but, unfortunately, the brittle point of these materials is not much lower than that of the basic poly(vinyl chloride) resin. Therefore, the low temperature properties were not significantly improved by the prior art techniques.

The prior art also teaches the use of certain macroazonitriles in an addition polymerization reaction with vinyl chloride to produce poly(vinyl chloride)-containing block copolymers. Furukawa et al disclosed this technique in *Angewandte Makromolekulare Chemie* 1 (1967) 92–104 (Nr. 10). However, Furukawa et al used a bulky isocyanate structure and low molecular weight poly(propylene oxide) to build his macroazonitrile. The resulting low molecular weight copolymers contained short, relatively inflexible poly(propylene oxide) segments connected to the stiff poly(vinyl chloride) segments through long, stiff, urethane-containing linkages. Such copolymers would offer little or no improvement over unplasticized PVC.

OBJECTS OF THE INVENTION

It is an object of our invention to provide an improved, internally plasticized vinyl resin. This material is preferably an ABA type block copolymer wherein said A blocks are poly(vinyl chloride) groups or groups of vinyl chloride copolymerized with small amounts of other vinyl monomers, e.g. vinylidene chloride, and said B block is a relatively high molecular weight poly(ethylene oxide) group. This block copolymer has the desirable properties of poly(vinyl chloride) but is significantly more flexible than the unplasticized PVC homopolymer.

It is a further object of our invention to provide a method of preparing an improved, internally plasticized vinyl resin. This process employs a novel macroazonitrile formed from 4,4'-azobis (4-cyanovaleroyl chloride), or a suitable analogue thereof, and a suitable, relatively high molecular weight poly(ethylene oxide). When this macroazonitrile is heated in the presence of a vinyl monomer, it decomposes into several macrobiradicals, each of these contain a linear, flexible poly(ethylene oxide) segment with a free radical on each end. These free radicals initiate the addition polymerization of the vinyl monomer onto both ends of the flexible poly(ethylene oxide) segments.

It is another object of our invention to provide improved thermoplastic polyvinyl chloride sheet molding materials containing internal (i.e. intramolecular) plasticizing segments.

SUMMARY OF THE INVENTION

In accordance with a preferred embodiment of our invention, these and other objects are achieved by providing a flexible sheet molding compound containing up to about 30 parts by weight of a conventional external plasticizer per 100 parts by weight of a novel ABA type copolymer, wherein said A segments are poly(vinyl chloride) and said B segment is poly(ethylene oxide). The total molecular weight ($\overline{Mn}$) of the copolymer is preferably within the range of 30,000 to 60,000, and the poly(vinyl chloride) segments constitute from about 65% to 90% of the copolymer.

This novel copolymer is formed by using flexible macrobiradicals to initiate the polymerization of vinyl chloride, or of mixtures of vinyl chloride with small amounts of other vinyl monomers such as vinylidene chloride, vinyl esters and acrylonitile. Structurally, the macrobiradicals consist of a poly(ethylene oxide) segment having a molecular weight in the range of from 6,000 to 20,000 and two free radical sites which are located on either end of this flexible polymer segment. Therefore, during the polymerization reaction, vinyl chloride groups are added onto each end of the poly(ethylene oxide) segment forming the subject ABA type copolymer.

The macrobiradicals are produced by the thermal decomposition of a macroazonitrile molecule. Structurally, the macroazonitrile consists of several poly(ethylene oxide) segments coupled together through azo (—N=N—) linkages. The molecular weight of the macroazonitrile is within the range of 20,000 to 150,000, preferably about 80,000. When this substance is heated to about 50°c. in the presence of vinyl chloride, each azo linkage (—N=N—) breaks, forming the macrobiradicals (.C~C.) which, in turn, initiate the polymerization of the vinyl chloride.

The macroazonitrile is formed by reacting a hydroxy terminated poly(ethylene oxide) of the preferred molecular weight with a suitable diacid chloride compound having an azo (—N=N—) linkage.

The flexible sheet molding compound formed in accordance with the procedures disclosed herein may be used in place of the PVC homopolymer which requires from 30 to 60 phr of an external plasticizer to achieve the necessary flexibility. In general, when an external plasticizer is added to the subject copolymer, the required concentrations are low enough to avoid the migration problems associated with the PVC homopolymer.

These and other advantages of this invention will be more easily understood in view of the detailed description, including specific examples, which follows.

DETAILED DESCRIPTION OF THE INVENTION

In accordance with our invention, it is possible to significantly reduce the concentration of the conventional external plasticizer in a composition having the basic properties of poly(vinyl chloride) and still maintain the flexibility required in thin sheet molding applications. It is generally recognized that the plasticizer migration problem appears only if the concentration exceeds 20 phr and grows progressively worse as the concentration increases. Therefore, we adopted the intermediate goal of synthesizing a composition having acceptable properties with an external plasticizer concentration of 20 phr, and we have achieved that goal by polymerizing an ABA type copolymer wherein the A segments are poly(vinyl chloride) blocks having a molecular weight in the range of 15,000 to 20,000 and the B block is flexible poly (ethylene oxide) having a molecular weight in the range of 6,000 to 20,000. It appears that the amount of external plasticizer necessary to maintain an acceptable degree of flexibility is inversely related to the length of the flexible poly(ethylene oxide) segment. The ultimate goal is to synthesize a compound which requires no external plasticizer; however, by substantially reducing the plasticizer migration problem we have made a significant step forward.

The relevant physical properties of various plasticized compositions prepared in accordance with this invention were evaluated and then compared with the conventional plasticized PVC.

These properties include the tensile strength (ASTM D638-71), tear strength (ASTM D1004-66), hardness (ASTM D2240-68), modulus at 100% elongation (ASTM D638-71), and torsional stiffness (ASTM D1043-69). The torsional stiffness test was originally used in the rubber industry and is defined as that temperature at which a material has a modulus of elasticity of 135,000 psi. For the intended applications, a suitable material will have a torsional stiffness in the range of about minus 5°C. to minus 20°C.

The aforementioned physical properties of poly(vinyl chloride) (PVC) with varying plasticizer concentrations are listed in Table 1. The plasticizer used in all formulations was di-2-ethylhexyl phthalate (DOP).

Table 1

| | The Physical Properties of PVC With Varying Concentrations of DOP | | | | |
|---|---|---|---|---|---|
| DOP, phr | 0 | 10 | 20 | 30 | 40 |
| Tensile Strength, psi | 8980 | 6360 | 3900 | 2992 | 2516 |
| Elongation, Ultimate % | 5 | 85 | 207 | 284 | 366 |
| 100% Modulus, psi | — | — | 2915 | 1560 | 1332 |
| Tear Strength, lb./in. | 1104 | 808 | 570 | 353 | 304 |
| Hardness, Shore A | — | — | 89 | 85 | 75 |
| Torsional Stiffness, Tf, °C. | 65 | 34 | 24 | −5 | −12 |

The subject block copolymer is polymerized by heating a suitable macroazonitrile compound in the presence of vinyl chloride. Structurally, the macroazonitrile is composed of several poly(ethylene oxide) segments coupled together by azo bonds (—N=N—). When heated to a temperature of about 50°C., the azo bonds decompose and several macrobiradicals, which are the poly(ethylene oxide) segments with a free radical on each end, are formed. The free radicals then initiate the polymerization of the vinyl chloride. The effect of this reaction is the growth of poly (vinyl chloride) segments from each end of the macrobiradical.

The polymerization of vinyl monomers, utilizing free radicals from the thermal decomposition of azo linkages, has been well documented in the prior art, e.g. U.S. Pat. No. 2,586,995. This technique has been used in each of the three basic polymerization modes -(a) in bulk, (b) in a solvent, and (c) in an emulsion. The subject polymerization was carried out in each mode, but the emulsion mode is preferred as it consistently produced copolymers with a molecular weight within the suitable range of from 30,000 to 60,000.

The structure of the final polymer will ideally be an ABA type copolymer with the A segments formed by the polymerization of the vinyl monomer and the B segment being the poly(ethylene oxide) segments which were initially a part of the macroazonitrile. However, as would be obvious to one skilled in the art of addition polymerization reactions, the exact structure of the final polymer will be determined by the dominant termination reaction mechanism and the growing chains' tendency to undergo a chain transfer mechanism. If the dominant termination mechanism is the coupling of two radical sites there will be a significant concentration of alternating block copolymers having a general structure of the type - . . . ABABA . . . If, however, the dominant mechanism is disproportionation, the structure of the polymerization reaction product will approach the ideal ABA structure. Finally, if the polymerizing chain undergoes chain transfer there will be significant branching in the polymer structure.

All of the above mechanisms will occur to some degree in any addition polymerization reaction. However, one will usually dominate and the reaction products of the other mechanisms will be present in small amounts, but the presence of these various products make it difficult, if not impossible, to define with precision the exact product of this polymerization reaction.

The macroazonitrile is also a polymer and is formed by reacting a suitable diacid chloride containing an azo bond (—N=N—) with a hydroxy terminated poly(ethylene oxide). For example, a suitable macroazonitrile is prepared by reacting 4,4'-azobis (4-cyanovaleroyl chloride), which is a diacid chloride compound described by the formula:

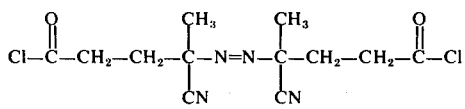

and a hydroxy terminated poly(ethylene oxide) having the general formula:

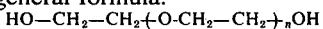

and having a molecular weight in the suitable range of from 3,000 to 20,000, and preferably about 12,000. During this reaction, alternating azo and glycol molecules combine to form a macroazonitrile with a repeat unit described by the following formula:

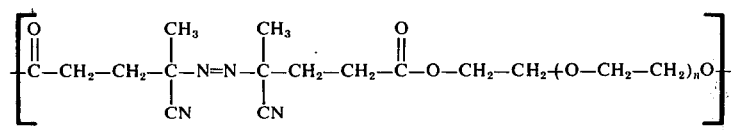

and having a molecular weight within a suitable range of from 20,000 to 150,000, and preferably about 80,000. HCl is also produced during this reaction and must be immediately removed by a suitable scavenger such as triethyl amine.

The azo groups, the poly(ethylene oxide) segments and the ester linkages are the important structural features of the macroazonitrile in view of the final copolymerization products, and other elements of the reacting molecules may vary considerably. For example, the number of carbon atoms between the acid chloride group and the azo linkage may vary from 2 to 10. In addition, the pendant groups on the carbon atoms adjacent to the azo linkage may be any of a nitrile group, a methyl group, an alicyclic group, a benzyl group, a substituted benzyl group, or a saturated hydrocarbon chain having up to 5 carbon atoms, with or without ether, aldehyde or ester functionalities.

For each of the following examples a fresh solution of 4,4'-azobis(4-cyanovaleroyl chloride) was prepared by the following standard procedure. The reaction was carried out in a dried, four-necked, one-liter flask equipped with a stirrer, a thermometer, an addition funnel and a nitrogen inlet. 250 milliliters of dry methylene chloride and 0.1 mole of 4,4'-azobis(4-cyanovaleric acid) were placed in the flask. Then 0.4 mole of purified thionyl chloride in 75 milliliters of dry 1,4-dioxane was added dropwise to the four-necked flask. The solution was warmed to 35°C. and the stirring was continued for sixteen hours under a nitrogen atmosphere. The solvents were removed by evaporation in vacuo and the resulting viscous oil was dissolved in a minimum of dry ether and cooled to minus 20° C. The desired product, 4,4'-azobis(4-cyanovaleroyl chloride), precipitated as a fine pale yellow crystalline material with a melting point of 80° to 82° C.; the acid chloride was then recrystallized from a solution of equal parts of chloroform and ether to give a white crystalline material with a melting point of 86° to 87° C. The yield of this reaction was 65%.

The preparation of the macroazonitrile in each example involved the addition of the acid chloride to a poly(ethylene oxide) glycol in the presence of an HCl scavenger, triethyl amine. The glycol was added in excess of the stoichiometric amount by 0.1% to 5% by weight. If too little glycol were added, there would be some of the undesirable acid chloride terminated macroazonitrile produced; if too much glycol were added, there would be a significant concentration of unreacted glycol in the macroazonitrile. The preferred glycol excess is 3%. The triethyl amine should be present at a concentration in excess of the acid chloride by 5 to 10 times by weight to insure a rapid scavenging action.

The subject block copolymers were evaluated in terms of the physical properties which indicate how a flexible material will perform as a thin sheet and this data was compared with similar data, which is itemized in Table 1, derived from testing both plasticized and non-plasticized poly(vintyl chloride) homopolymer.

EXAMPLE 1

The macroazonitrile for this example was prepared in a four-necked two-liter flask equipped with a high speed stirrer, thermometer, addition funnel and a nitrogen inlet. Initially, 1,000 milliliters of dry toluene and 0.1 mole of triethylamine were added to this flask. Then 0.017 mole of a Carbowax, which is a hydroxy terminated poly(ethylene oxide), having a molecular weight of 3,000 as calculated by the hydroxyl number, was added to the above solution. This solution was warmed until all the Carbowax dissolved and then, with vigorous stirring, a solution consisting of 200 milliliters of dry toluene and (0.015 mole) of freshly prepared 4,4'-azobis(4-cyanovaleroyl chloride) was added at a fast drop rate. The viscosity of the reacting solution continually increased with the addition of the acid chloride and the reaction temperature rose to 40° C. Stirring was continued for four hours and the temperature was maintained at 35° C. After this time the solution was diluted with benzene to facilitate the subsequent filtering process which removed the triethyl amine hydrochloride salt. After the filtering step, the solvents were removed. As would be obvious to one skilled in the art, the triethyl amine was added as a hydrogen chloride scavenger in order to prevent that compound from inhibiting the polymerization reaction. The polymer was precipitated into normal hexane, then washed with normal hexane, and dried.

The resulting macroazonitrile was a white solid having a molecular weight of 69,500, as determined by osmometry, and an inherent viscosity of 0.69, as measured at 30° C. in tetrahydrofuran at a concentration of 1 gram per 100 milliliters. The degree of polymerization was 22. This macroazonitrile was then used as an initiator to polymerize vinyl chloride and in an emulsion mode.

This emulsion polymerization was carried out in an autoclave. Seventy grams (0.00105 mole) of the macroazonitrile prepared from the Carbowax having a molecular weight of 3,000 was put in the autoclave with 560 grams of the deoxygenated water and 20 grams of sodium lauryl sulfate soap. The solution was stirred until all the macroazonitrile was dissolved, and then cooled under a nitrogen purge to minus 78° C. 312 grams (4.8 moles) of vinyl chloride were added and the system was again purged with nitrogen and sealed.

The reacting ingredients were held at a temperature 48° C. for twenty-four hours. Then the emulsion was poured into a salt solution to break up the latex, and the resulting mixture was filtered. The polymer was then washed with large amounts of hot water to remove all soap and any unreacted macroazonitrile. Then the polymer was washed with methanol and dried.

The block copolymer produced in this example had a molecular weight, as measured by membrane osmometry, of about 42,000. The inherent viscosity was 0.74, as measured at 30° C. in tetrahydrofuran at a concentration of 1 gram per 100 milliliters. The degree of conversion was 76% and the measured chloride concentration was 50.7% as compared with a calculated value of 52.0% based on an ABA type block copolymer.

The physical properties of the block copolymer produced by the procedures described in this example are itemized in the first column of Table 2. The remaining four columns illustrate the physical properties of this block copolymer after it had been plasticized with di-2-ethylhexyl phthalate (DOP) at concentrations of 10, 20, 30 and 40 parts by weight of DOP per 100 parts of block copolyer.

Table 2

The Physical Properties of the Block Copolymer Having a Flexible Block Molecular Weight of 3,000 With Various Concentrations of DOP

| DOP, phr | 0 | 10 | 20 | 30 | 40 |
|---|---|---|---|---|---|
| Tensile Strength, psi | 6460 | 3433 | 2586 | 1630 | 1020 |
| Elongation, Ultimate % | 60 | 203 | 230 | 290 | 165 |
| 100% Modulus, psi | — | 3070 | 1800 | 1300 | 820 |
| Tear Strength, lb./in. | 904 | 593 | 365 | 270 | 240 |
| Hardness, Shore A | — | 92 | 89 | 85 | 82 |
| Torsional Stiffness, Tf, °C. | 38 | 25 | 7 | −9 | −20 |

By interpolating the torsional stiffness data, this particular block copolymer apparently achieves the desired flexibility at around 25 phr of DOP which is above the maximum level of 20 phr at which there is no plasticizer migration problem. Therefore, while this material has the desired flexibility at plasticizer concentration significantly below that of the PVC homopolymer, the plasticizer migration problem would only be reduced and not eliminated by using this particular copolymer.

EXAMPLE 2

Using the techniques described in Example 1, a Carbowax having a molecular weight of 6,000 was used in the preparation of the macroazonitrile. The product was a white solid and had a molecular weight of 87,700 and an intrinsic viscosity of 1.040. The degree of polymerization was 13 and the measured nitrogen content was 1.10% as compared to the calculated 1.05%.

Using 80 grams of the macroazonitrile and 312 grams of vinyl chloride, the emulsion polymerization techniques described in Example 1 produced a block copolymer having a molecular weight of 46,800 and an intrinsic viscosity of 0.79. The conversion was 87% and the resulting compound had a measured chloride concentration of 46.1% as compared to the 48.7% chloride, as calculated on the basis of an ABA type block copolymer.

The physical properties of the block copolymer of this example are itemized in Table 3. The properties of both the unplasticized and plasticized polymers are listed.

Table 3

The Physical Properties of the Subject Block Copolymer With a Flexible Segment Molecular Weight of 6,000 at Various Plasticizer Concentrations

| DOP, phr | 0 | 10 | 20 | 30 | 40 |
|---|---|---|---|---|---|
| Tensile Strength, psi | 6000 | 2916 | 2100 | 1440 | 884 |
| Elongation, Ultimate % | 80 | 240 | 280 | 230 | 185 |
| 100% Modulus, psi | — | 1810 | 1315 | 1170 | 700 |
| Tear Strength, lb./in. | 814 | 428 | 279 | 245 | 180 |
| Hardness, Shore A | — | 90 | 87 | 75 | 72 |
| Torsional Stiffness, Tf, °C. | 36 | 12 | −4 | −15 | −25 |

It is noteworthy that at a plasticizer concentration of 20 phr, the torsional stiffness of the copolymer is at the lower limit of the acceptable range of minus 5° to minus 20° C. This particular concentration of plasticizer is the maximum level at which there is no plasticizer migration problem. Therefore, this particular block copolymer which has a flexible segment molecular weight of 6,000 has the desired flexibility at an acceptable plasticizer concentration.

EXAMPLE 3

Using the procedure described in Example 1, a macroazonitrile was prepared using a Carbowax having a molecular weight of 12,000 as calculated from hydroxyl numbers. This macroazonitrile was a white solid having a molecular weight of 74,000 and an inherent viscosity of 0.79 as measured at 30° C. in tetrahydrofuran at a concentration of 1 gram per 100 milliliters. The degree of polymerization was 6.

Using 80 grams of the aforementioned macroazonitrile and 312 grams of vinyl chloride, the emulsion polymerization procedures as described in Example 1 produced a block copolymer having a molecular weight of 50,000 and an intrinsic viscosity of 0.89. The degree of conversion was 84% and the measured chloride content was 40.5% as compared to 43.1%, calculated on a basis of an ABA type block copolymer.

The physical properties of this block copolymer, tested at several plasticizer concentrations ranging from 0 to 40 phr, are listed in Table 4.

Table 4

The Physical Properties of a Block Copolymer Having a Flexible Segment Molecular Weight of 12,000 With Various Concentrations of DOP

| DOP, phr | 0 | 10 | 20 | 30 | 40 |
|---|---|---|---|---|---|
| Tensile Strength, psi | 4700 | 2640 | 1960 | 790 | 600 |
| Elongation, Ultimate % | 120 | 260 | 200 | 190 | 190 |
| 100% Modulus, psi | 3540 | 1900 | 1600 | 450 | 325 |
| Tear Strength, lb./in. | 620 | 310 | 252 | 110 | 59 |
| Hardness, Shore A | 90 | 86 | 72 | 62 | — |
| Torsional Stiffness, Tf, °C. | 20 | 8 | −5 | −22 | — |

From this data it is apparent that this copolymer, having a flexible segment with a molecular weight of 12,000 and having a plasticizer at a concentration of 20 phr, produces a desirable sheet molding compound.

This material has a distinct advantage over the poly(vinyl chloride) homopolymer in that the desired flexibility is achieved with a plasticizer concentration below that level which produces a plasticizer migration problem.

In a typical emulsion polymerization reaction the recipe includes, by weight, from 30 to 60 parts vinyl choride, preferably 40 parts, from 4 to 10 parts of the macroazonitrile; preferably 6 parts, from 1 to 2 parts of a suitable soap, preferably 1.5 parts, and from 50 to 70 parts water, preferably 60 parts. The polymerization reaction can be carried out in both sealed pressure bottles and an autoclave for a period of from eighteen to thirty hours, preferably twenty-four hours, at a temperature of from 45° to 55° C., preferably 48° C.

It should be noted that the A segments of this copolymer contribute the basic physical properties to the material and that the B segment contributes only flexibility. Therefore, there is a limit on the relative lengths of the A and B segments; if the B segment becomes the dominant portion, the properties of the copolymer will approach those of the B homopolymer instead of the desired properties of the A homopolymer. In view of the above limits and the ABA copolymer structure, the molecular weights of the B segment may vary from 3,000 to 20,000 and the molecular weights of the A segments may vary from 15,000 to 20,000. If kept within these limits wherein the B segment does not exceed 35% by weight of the copolymer it will have the basic properties of a plasticized A homopolymer.

The amount of the subject macroazonitrile used to initiate the polymerization is directly related to number of flexible polymer segments contained in each macroazonitrile molecule. The macroazonitrile molecule will, upon thermal decomposition, generate approximately twice the number of free radical sites as there are poly(ethylene oxide) segments in the original macroazonitrile molecule, and the number of free radical sites in the polymerization reaction will influence such parameters as the rate of polymerization and the average molecular weight of the product. In this context the range of the macroazonitrile concentration was selected to produce a copolymer suited for thin sheet molding applications. However, by altering this concentration, the basic properties of the resulting product could be altered to fit many varied applications.

The subject change in the PVC structure does not significantly affect its compatibility with the conventional plasticizers. The following were tested and proved as effective as the DOP in the subject composition at the same concentrations: (1) diisodectyl phthalate, (2) trioctyl trimellitate, (3) tri(cresyl) phosphate, (4) epoxidized soybean oil, and (5) dioctyl phthalate.

While our invention has been described in terms of a certain preferred embodiment, it will be appreciated that other forms thereof could readily be adopted by one skilled in the art. Therefore, the scope of our invention is not to be limited to the specific embodiment illustrated.

What is claimed is:

1. A flexible poly(vinyl chloride) molded article comprising by weight,
   A. 100 parts of an A-B-A type block copolymer wherein,
      a. A is a vinyl polymer segment formed predominantly from vinyl chloride, said segment having an average molecular weight ($\overline{Mn}$) in the range of 15,000 to 20,000, and
      b. B is described by the general formula:

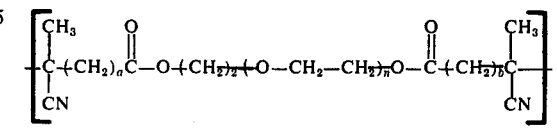

where $a$ and $b$ may vary from 2 to 10 and n may vary from 135 to 500, said copolymer having a molecular weight ($\overline{Mn}$) in the range of 33,000 to 60,000, and
   B. from 5 to 40 parts of a plasticizer.

2. An ABA type block copolymer having a torsional stiffness below about 36° C. wherein said A blocks each consist essentially of poly(vinyl chloride) having a molecular weight ($\overline{Mn}$) in the range of from 15,000 to 20,000 and said B block consists essentially of poly(ethylene oxide) having a molecular weight ($\overline{Mn}$) in the range of from 6,000 to 20,000.

3. A flexible sheet molding compound having a torsional stiffness below about 20° C. comprising, by weight, 100 parts of an ABA type block copolymer wherein said A blocks each consist essentially of poly(vinyl chloride) having a molecular weight ($\overline{Mn}$) in the range of from 15,000 to 20,000 and said B block consists essentially of poly(ethylene oxide) having a molecular weight ($\overline{Mn}$) in the range of from 6,000 to 20,000, and from 5 to 40 parts of a plasticizer.

4. A block copolymer having the general formula A—B—A wherein
   a. A is a vinyl polymer segment formed predominantly from vinyl chloride, said segment having an average molecular weight ($\overline{Mn}$) in the range of 15,000 to 20,000, and
   b. B is described by the general formula:

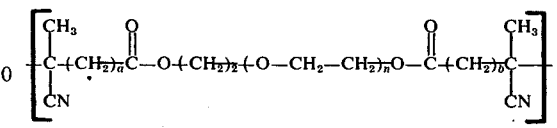

where $a$ and $b$ may vary from 2 to 10 and n may vary from 135 to 500, said copolymer having a molecular weight ($\overline{Mn}$) in the range of 33,000 to 60,000.

5. A plasticized poly(vinyl chloride) composition suitable for use in applications requiring thin, flexible and strong materials comprising by weight,
   (A) 100 parts of an internally plasticized poly(vinyl chloride) resin consisting essentially of an A—B—A block copolymer wherein,
      a. A is a vinyl polymer segment formed predominantly from vinyl chloride, said segment having an average molecular weight ($\overline{Mn}$) in the range of 15,000 to 20,000, and
      b. B is described by the general formula:

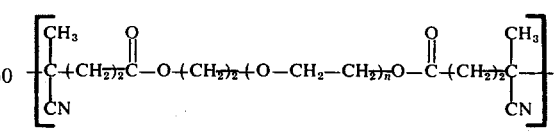

where $n$ may vary from 135 to 500, said copolymer having a molecular weight ($\overline{Mn}$) in the range of 33,000 to 60,000, and
   B. from 5 to 40 parts of a plasticizer.

* * * * *